(12) United States Patent
Nortier et al.

(10) Patent No.: US 7,177,725 B2
(45) Date of Patent: Feb. 13, 2007

(54) SYSTEM FOR THE MONITOR AND CONTROL OF REST ROOMS

(76) Inventors: Richard A. Nortier, 1903 Portsmouth Ave., Westchester, IL (US) 60154; Edward J. Yenni, 32139 Hampton Ct., Avon Lake, OH (US) 44012; William O. Limkemann, 589 Debbington Dr., Bay Village, OH (US) 44140

( * ) Notice: Subject to any disclaimer, the term of this patent is extended or adjusted under 35 U.S.C. 154(b) by 65 days.

(21) Appl. No.: 11/049,137

(22) Filed: Feb. 2, 2005

(65) Prior Publication Data
US 2005/0171709 A1 Aug. 4, 2005

Related U.S. Application Data (60) Provisional application No. 60/541,159, filed on Feb. 2, 2004.

(51) Int. Cl.
*G05D 11/00* (2006.01)
*G05D 7/00* (2006.01)
*G05D 9/00* (2006.01)

(52) U.S. Cl. .......................... 700/282; 700/19; 700/20; 700/281; 702/45; 702/46; 702/49; 251/129.04; 251/129.01; 251/129.05; 73/1.16; 73/1.36; 137/2; 137/3; 137/12

(58) Field of Classification Search ................ 700/65, 700/66, 20, 281, 282, 283, 284; 340/686.1; 251/129.04, 129.01, 129.05; 702/45–49; 73/1.16, 1.36; 137/2.12
See application file for complete search history.

(56) References Cited

U.S. PATENT DOCUMENTS

| | | | |
|---|---|---|---|
| 5,410,471 A * | 4/1995 | Alyfuku et al. ............ | 600/300 |
| 6,250,601 B1 * | 6/2001 | Kolar et al. ............ | 251/129.04 |
| 6,286,764 B1 * | 9/2001 | Garvey et al. ............ | 236/12.12 |
| 6,568,655 B2 * | 5/2003 | Paese et al. ............ | 251/129.04 |
| 6,697,103 B1 * | 2/2004 | Fernandez et al. .......... | 348/143 |
| 2002/0007510 A1 * | 1/2002 | Mann ............................ | 4/300 |
| 2002/0057340 A1 * | 5/2002 | Fernandez et al. .......... | 348/143 |
| 2003/0088338 A1 * | 5/2003 | Phillips et al. .............. | 700/282 |
| 2004/0206405 A1 * | 10/2004 | Smith et al. ............ | 137/624.12 |
| 2004/0232370 A1 * | 11/2004 | Parsons et al. ........ | 251/129.04 |
| 2004/0257237 A1 * | 12/2004 | Bialecki et al. .......... | 340/686.1 |
| 2005/0062004 A1 * | 3/2005 | Parsons et al. ........ | 251/129.04 |
| 2006/0090909 A1 * | 5/2006 | Carter ........................ | 172/111 |

\* cited by examiner

*Primary Examiner*—Ramesh Patel
(74) *Attorney, Agent, or Firm*—Eschweiler & Associates, LLC (57) ABSTRACT

The present invention is directed to a rest room control system including one or more sensors configured to monitor or control a function associated with the rest room. The system also includes a controller operably coupled to the one or more sensors, and configured to receive data therefrom associated with the function, and communicate a status condition associated with the function in response thereto.

26 Claims, 8 Drawing Sheets

SYSTEM FOR THE MONITOR AND CONTROL OF REST ROOMS

REFERENCE TO RELATED APPLICATION

This application claims the benefit of U.S. Provisional Patent Application Ser. No. 60/541,159 which was filed Feb. 2, 2004, entitled WATER MANAGEMENT SYSTEM.

FIELD OF THE INVENTION

The present invention relates generally to control systems, and more particularly to a control system operable to monitor activity of a rest room and schedule maintenance or other activity in response thereto.

BACKGROUND OF THE INVENTION

The traditional commercial restroom has provided water control through either manual operation, or automatic operation using infrared sensors, of water valves in sinks, water closets, and urinals. Typically, each valve operates alone with no communication or direct interaction with other valves. As a result, maintenance and housekeeping needs can only be determined by a physical observation of the restroom. The lack of restroom automation can lead to wasted water due to valves that leak or run-on, flooding, flow-failure, exhausted consumable supplies, inoperable water fixtures, increased cost of ownership, and/or general owner and user dissatisfaction due to any of the above.

Accordingly, there is a need for improved monitoring and control of rest rooms.

SUMMARY OF THE INVENTION

The following presents a simplified summary in order to provide a basic understanding of some aspects of the invention. This summary is not an extensive overview of the invention. It is intended to neither identify key or critical elements of the invention nor delineate the scope of the invention. Rather, the primary purpose of this summary is to present some concepts of the invention in a simplified form as a prelude to the more detailed description that is presented later.

The present invention is directed to a system and method for monitoring and/or controlling one or more rest rooms. The system comprises one or more sensors that are operable to monitor and/or control a function associated with the rest room, and a controller (e.g., a rest room controller or LCU) that is operably coupled to the one or more sensors. The controller is operable to receive data from the sensors associated with the rest room function, and communicate a status condition associated with the function in response thereto.

The system of the present invention finds utility in a variety of settings, for example, in a large facility such as an arena, an airport or a convention center, in which many rest rooms reside. In such an instance, the system of the present invention may be employed to sense various fixtures within a rest room, such as one or more sinks, one or more toilets, one or more urinals, and one or more hand dryers, as well as supplies associated therewith such as toilet paper, towels, and various hygiene products such as soap, deodorizers and/or sanitizers. The sensors, in one embodiment of the present invention, are operable to sense a function or operating state of the fixture and communicate such information to the controller. The controller is configured to receive such data and communicate a status condition associated therewith. For example, in one instance, the controller is operable to generate and transmit an alarm notification if a fixture sends data that indicates an operating anomaly, or if usage data indicates that one or more supplies are, or will soon be, completely consumed, thereby requiring replenishment.

In another example of the present invention, the controller is further configured to collect various pieces of data over a period of time and construct historical usage type profiles in order to dynamically generate thresholds in which alarms are generated and transmitted for response thereto. For example, based on changes in traffic and/or usage within a rest room, the controller is configured to alter a threshold in which an alarm is generated, for example, to ensure that preventive maintenance or supply replenishment occur in a timely manner prior to fixture malfunctions or supplies being completed consumed.

In accordance with another aspect of the present invention, the rest room control system comprises a patron call device that is configured to be manually activated in response to a service need associated with the rest room. The controller is operable to receive a patron call request, and communicate such a request as an alarm notification, as well as generate a time/date stamp associated with the request. Upon the service need being addressed, the patron call device is manually or otherwise deactivated, and such deactivation is communicated to, and time/stamped by, the controller in order to record a service response time associated with the request. The service response time, in one example, is then employed by the controller to dynamically alter one or more thresholds associated with alarm notifications associated with the rest room.

In accordance with another aspect of the present invention, the system comprises fixture controllers associated with one or more fixtures in the rest room that are operable to provide a control function to the fixtures and communicate such control or other information to the rest room controller. For example, the fixture controllers may comprise a plurality of activation devices associated with a plurality of toilets, respectively. Upon activation thereof, data is sent to the rest room controller and recorded, for example, as a count and/or time/date stamp. The controller may then use such information in scheduling and communicating preventive maintenance alarms. Alternatively, or additionally, the controller may determine deviations in usage in one fixture compared to other fixtures or deviations in usage of a particular fixture over time, and generate an alarm notification in response thereto for investigation of possible fixture malfunction.

In accordance with yet another embodiment of the invention, the system comprises a water flow sensor and a valve (e.g., a motor or solenoid actuated valve) associated with a main water supply line of the rest room, or associated with sub-lines associated with various fixtures therein. The controller is configured to analyze data from the water flow sensor(s) and generate an alarm indication in response thereto based on various circumstances. For example, if the rest room is in an out-of-use time period (e.g., a baseball stadium rest room in the off-season), and water flow is detected in the main water supply associated with that rest room, the controller is configured to close the valve associated therewith to prevent possible flooding. Additionally, or alternatively, if many toilets in a given rest room are activated substantially simultaneously, the controller is configured to limit or delay the function of one or more of the fixtures in order to reduce the pipe sizing requirements associated therewith.

In accordance with still another embodiment of the present invention, a plurality of rest room controllers associated with a respective rest room are operably coupled to a global command unit. In the above manner, the data associated with each of a plurality of rest rooms in a large venue are fed to a central controller in which usage, traffic, supply conditions, etc., are collected for various rest rooms, along with historical information associated therewith. The rest room controllers are operable to relay alarm notifications to the global command unit that, in turn, is operable to categorize and/or communicate such alarms to one or more users or personnel based thereon. For example, based on a type of alarm and a location thereof, the alarm may be communicated to a predetermined maintenance individual or a predetermined member of the janitorial staff via, for example, a pager, cell phone, etc. In addition, such alarm data and historical data are available for viewing, for example, remotely via a web page access type system.

The present invention is also directed to a method of monitoring and/or controlling a rest room. The method comprises sensing or controlling a function associated with the rest room, and communicating a status condition associated therewith. In one example, the communicated status condition comprises an alarm notification associated with the function, wherein the alarm identifies the function at issue, thereby facilitating a maintenance request, a preventive maintenance request, or a supply replenishment request, for example.

In one embodiment of the present invention, a sensor and/or fixture controller is operably associated with a fixture in the rest room, as well as to a rest room controller. A function associated with a fixture is sensed or controlled by the sensor or fixture controller, respectively, and data associated therewith is then transmitted to the rest room controller. The rest room controller is configured to receive such data and communicate a status condition associated with the function, for example, sending an alarm notification to one or more devices, such as a pager, cell phone, wireless personal digital assistance (PDA), or a computer workstation.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The present invention is directed to a system and method of monitoring one or more functions associated with a rest room and communicating one or more status conditions associated therewith.

Figure 1:
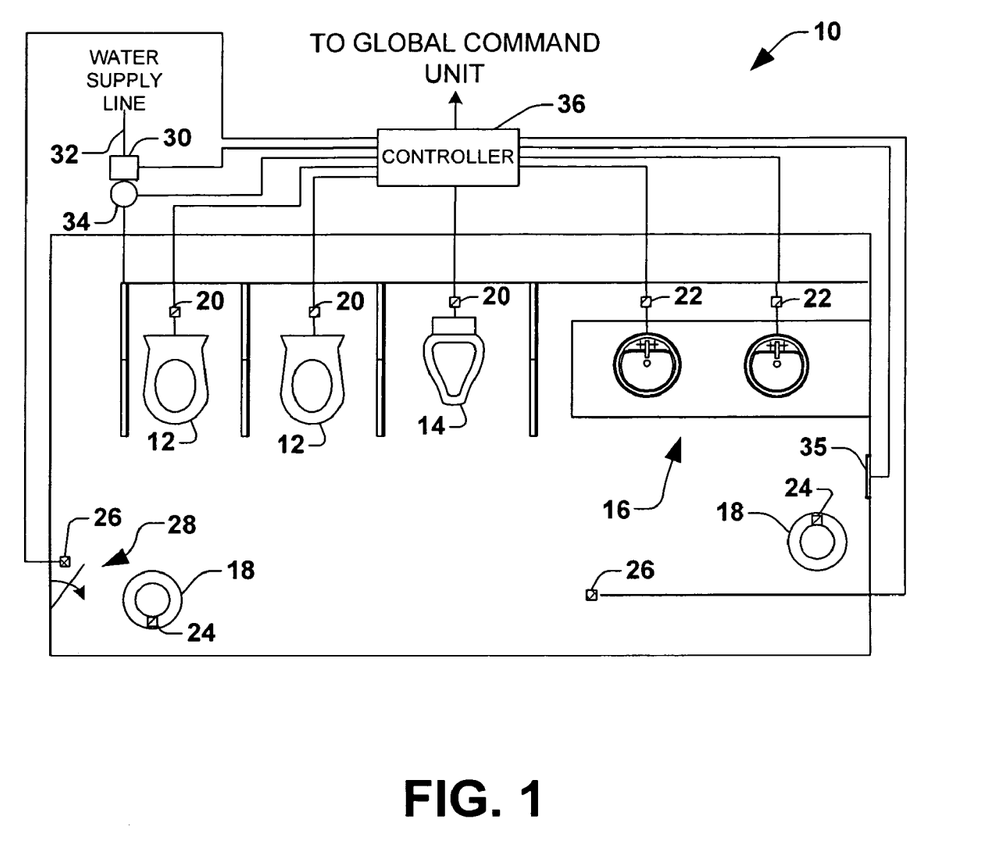
FIG. 1 is a combined block diagram and schematic diagram illustrating a rest room control system according to one exemplary embodiment of the present invention.

Turning now to the figures, FIG. 1 is a combined block diagram and schematic diagram illustrating one exemplary embodiment of the present invention. In FIG. 1, a rest room such as a commercial bathroom 10 has a plurality of differing kinds of fixtures therein. For example, fixtures may include one or more toilets 12, one or more urinals 14, one or more sinks 16, toilet papers dispensers (not shown), paper napkin dispensers (not shown), and trash receptacles 18. Other fixtures may also reside within the rest room 10 and all such fixtures are contemplated as falling within the scope of the present invention.

According to one example, each of the fixtures have a sensor associated therewith to sense a function associated with the given fixture. For example, an activation sensor 20 is associated with the toilets 12 and urinal 14, while water flow sensors 22 are associated with the sinks 16, respectively. While a single sensor is illustrated in FIG. 1 as being associated with a given fixture, multiple sensors having differing functions may be employed, as may be desired. For example, in one example, each water supply line (not shown) associated with a toilet 12 or urinal 14 may also have a water flow meter associated therewith. Based on the type of sensor employed, various differing functions associated with the fixtures may be monitored.

In addition, the rest room may include other types of sensors, for example, a sensor 24 associated with trash receptacles 18 indicating a state thereof (e.g., the trash can being full, or trash therein exceeding a predetermined threshold), and one or more motion sensors 26 employed at various locations within the facility 10. The motion sensors 26 may be employed alone or in concert to ascertain a traffic associated with the rest room as well as a usage thereof. For example, a motion sensor 26 located at an entrance 28 of the rest room 10 may give a count of a number of people entering and exiting the facility over a given period of time. In addition, a second motion sensor located at one or more other locations may be utilized to obtain a count of individuals that used the facility. For example, a motion detector may be located at the sinks 16 or at doors (not shown) of the toilets or other locations. In the above manner, two types of data may be collected to give information relating to what percentage of people entering the rest room 10 actually use the toilets, etc., as opposed to, for example, simply using the mirror for grooming or other purposes.

Still referring to FIG. 1, a sensor may include a water flow sensor associated with a main water supply line 32 providing water to the rest room. The water flow sensor 30 is operable to provide information as to whether water flow resides therein and/or an amount of water flow, respectively. The rest room may also include a plurality of fixture controllers (not shown) associated with the various fixtures, wherein such controllers are operable to selectively control one or more functions associated with the respective fixtures. For example, many sinks or urinals have motion sensors associated therewith that operate to activate water flow therein and thus operate to provide some measure of control. One illustrated fixture controller in FIG. 1 is a valve 34 (e.g., a motor or solenoid actuated valve) associated with the water supply line 32. Upon activation/deactivation thereof, the valve opens and closes and thus is operable to selectively permit or preclude water flowing through the water supply line to the various fixtures within the rest room.

The control system further comprises a patron call device 35 that is, for example, manually actuable and operable to send an alarm notification upon a user activation thereof. In one example, the patron call button is generic and simply indicates a user need in the rest room. In another alternative, the patron call device contains multiple buttons or indicators, and is configured to send data relating to specific requests, for example, a maintenance request, a supply replenishment request, or a medical emergency.

FIG. 1 also illustrates a rest room controller (also called a local control unit or LCU) 36. The rest room controller 36 is operably associated with each of the sensors and fixture controllers in the rest room as illustrated. Although FIG. 1 illustrates hard-wired type electrical connections, it should be appreciated that such sensors may be coupled to the controller 36 in a wireless or other type manner, and such alternatives are contemplated by the present invention. The rest room controller 36 is operable to receive data from one or more of the various sensors and/or fixture controllers within the rest room. Based on the received data, the controller is further operable to ascertain and communicate a status condition associated with the various monitored functions. In one example, communication of a status condition comprises a display of information, however, the present invention further contemplates such communication to include, for example, a sending of an alarm notification or fault notification to a central command unit and/or to one or more predetermined devices, such as a pager, a cell phone, a wireless personal digital assistant (PDA), a computer workstation, and/or a global command unit. Any manner of communicating such information may be employed and is contemplated as falling within the scope of the present invention.

Figure 2:
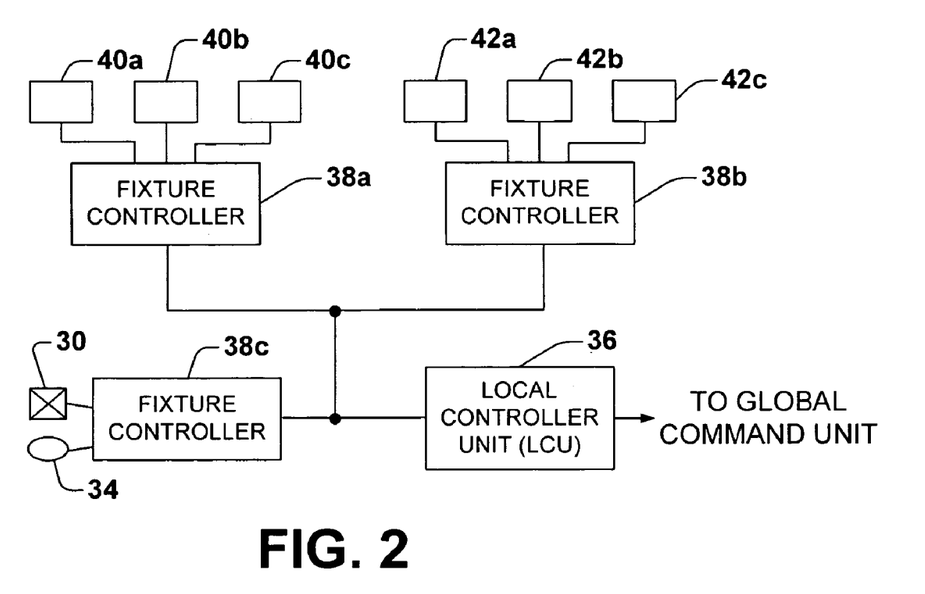
FIG. 2 is a block diagram illustrating a rest room control system employing a plurality of fixture controllers associated with respective fixtures within a given rest room coupled to a local or rest room controller according to the present invention.

FIG. 2 is a block diagram illustrating other aspects of the present invention. More particularly, FIG. 2 illustrates a plurality of fixture controllers 38a–38c associated with various fixtures in the rest room. Since the fixture controllers are operable to provide varying types of control based on the type of fixture associated therewith, such controllers are provided with differing reference numerals, however, such controllers may vary based on their programming as opposed to a hardware variation, as may be appreciated. Each fixture controller 38a–38c provides control to one or more fixtures 40a–40c, 42a–42c, as may be appreciated.

Also illustrated in FIG. 2 is a particular exemplary fixture controller associated with the main water supply line for purposes of explanation. In the illustrated example, the fixture controller 38c receives data from the water flow sensor 30 that it passes along to the rest room controller 36 (or LCU), and provides control instructions to the valve 34 in order to open or close the valve, respectively. Although the present example illustrates each fixture having a fixture controller associated therewith, it should be appreciated that some fixtures may not have such a controller, and in some instances, a single fixture controller may be dedicated to a single fixture.

Figure 3:
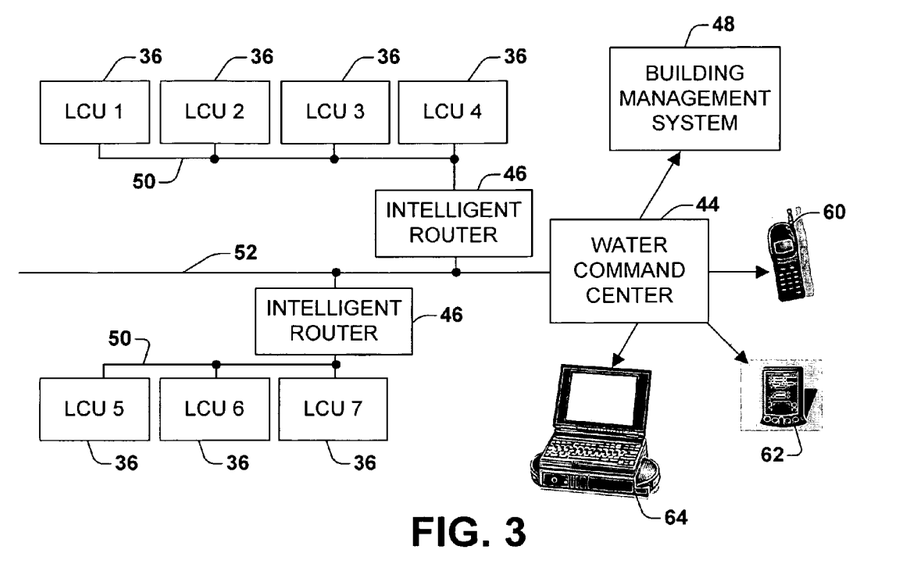
FIG. 3 is a block diagram illustrating a plurality of local or rest room controllers operably coupled to a global command unit or water command center according to another aspect of the present invention.

Turning to FIG. 3, a block diagram is provided illustrating another exemplary aspect of the present invention, wherein a plurality of facility controllers or LCUs 36, each individually associated with their own respective rest room are coupled to a central global command unit or water command center 44 through intelligent routers 46. The present invention contemplates a central monitor and control system associated with a large venue, such as a convention center, an airport, or a sports stadium in which a large number of rest rooms reside therein. In such an embodiment, each rest room has its own rest room controller or LCU 36 associated therewith, in which data is received from various sensors and or fixture controllers therein, and a status communication is then communicated in response thereto. More particularly, in the present example, such data is transmitted over a data bus 50, through a router 46, to a global command unit over a system level data bus 52.

In the present example the global command unit may be a water command center 44 or may be a building management system 48 in which all other building functions not associated with rest rooms are also coordinated. Any such variation is contemplated by the present invention. Although optional, the intelligent routers 46 are employed in the present example to facilitate an orderly transfer of data to the global command unit in an orderly fashion along the main data bus 52 in order to avoid packet collisions, etc. In one example, the analysis of collected data is performed at the LCUs and status conditions are passed on to the global command unit, however, in another embodiment of the present invention, some portions of analysis are performed at both the LCU level and at the global command unit level. For example, to the extent that further analysis is to be performed to compare and/or analyze historical or trend data between the various different rest rooms, such analysis is preferably done at the global command unit.

In the example illustrated in FIG. 3, the global command unit (e.g., water command center 44) receives status indication from the LCUs 36 and selectively sends out alarm notifications to one or more communication devices, such as a cell phone 60, personal digital assistant (PDA) 62, or computer workstation 64, or other devices. Alternatively, the LCUs may transmit such alarms directly to such devices 60, 62, 64, and such variations are contemplated by the present invention.

Functionality associated with the rest room control systems of FIGS. 1–3 will now be described in greater detail in conjunction with the flow charts of FIGS. 4–8 in which methods are described. Although the methods and functionality are illustrated and described below as a series of acts or events, it will be appreciated that the present invention is not limited by the illustrated ordering of such acts, events or functionality. For example, some acts may occur indifferent orders and/or concurrently with other acts or events apart from those illustrated and/or described herein, in accordance with the invention. In addition, not all illustrated functionality may be required to implement a methodology or system in accordance with the present invention. The methods of the present invention, moreover, may be implemented in association with the devices illustrated and described herein as well as in association with other devices and systems not illustrated.

Figure 4:
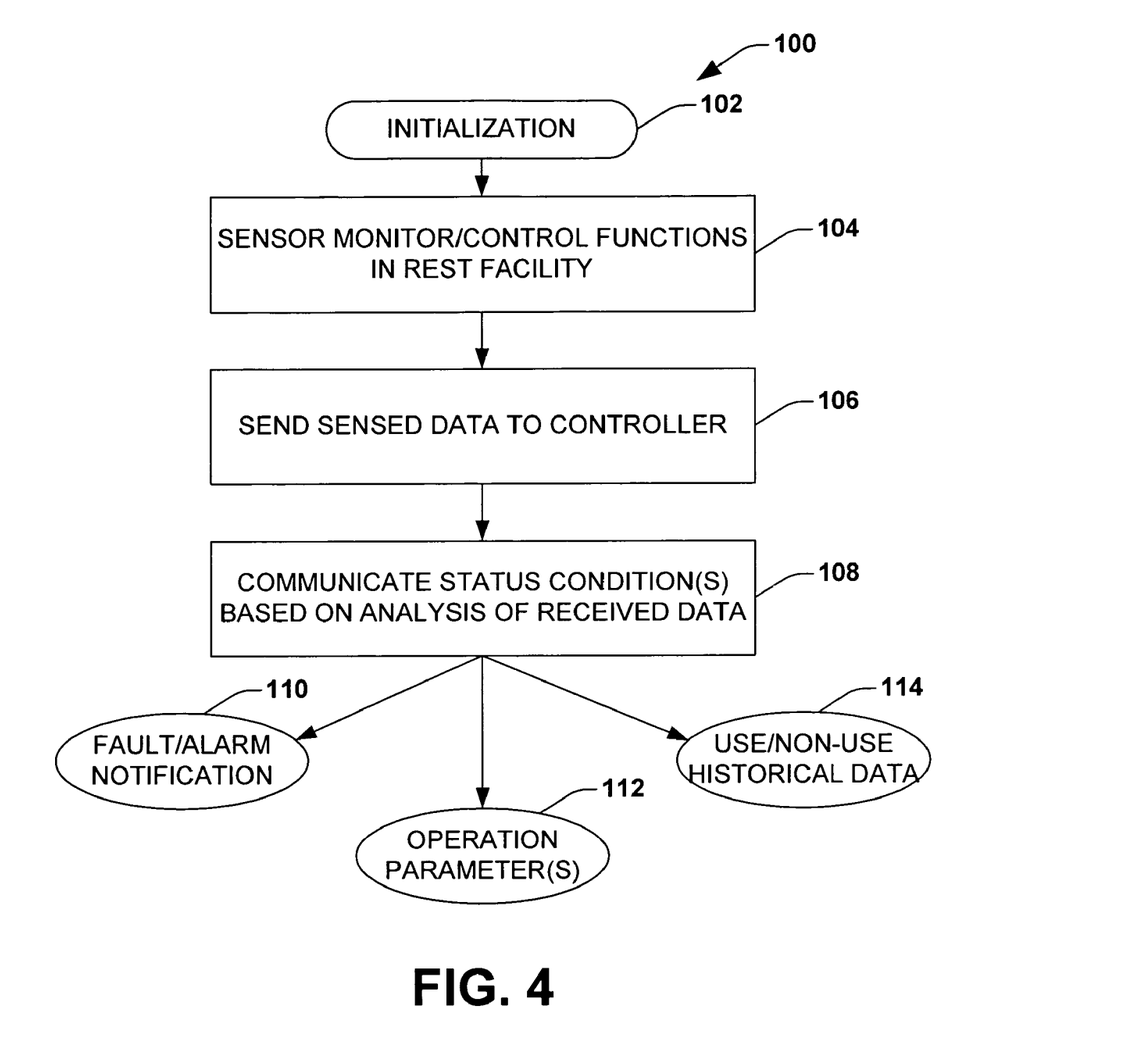
FIG. 4 is a flow chart diagram illustrating a method of monitoring and/or controlling a rest room according to another embodiment of the present invention.

Turning now to FIG. 4, a method 100 of monitoring and/or controlling a rest room is provided, wherein an initialization is performed at 102. Such initialization may include, for example, a generation of initial, predetermined thresholds associated with a variety of differing rest room functions, as will be more fully described infra. In addition, an initialization may include various protocols between sensors and controllers for various functions such as synchronization, handshake sequencing, etc., and any such initialization is contemplated by the present invention.

In the broadest sense, sensors employed within a rest room and/or fixture controllers also within the rest room execute pre-assigned functions by monitoring and/or controlling various functions therein at 104. For example, a motion sensor is operable to identify a motion within the rest room to generate a count associated therewith. An activation sensor is operable to identify when a toilet or urinal is flushed to likewise generate a count. Other sensors in the rest room may include sensors employed to identify the presence of supplies such as toilet paper, paper napkins, soap and other products such as deodorizers and/or sanitizers. Other sensors may further comprise water flow sensors that sense water flow through a main water supply line or in sub-lines associated with individual fixtures, as may be desired.

Each sensor or fixture controller sends the data associated therewith to a respective rest room controller or LCU at 106. The rest room controller is configured to receive such data and communicate a status condition associated with the respective functions at 108. In one example, the status condition is communicated to a global command unit such as the water command center 44 or the building management system 48 of FIG. 3, wherein such status conditions may include a fault or alarm notification 110, one or more operating parameters 112 or data relating to use or traffic in the rest room at a given time or over a period of time 114.

Figure 5:
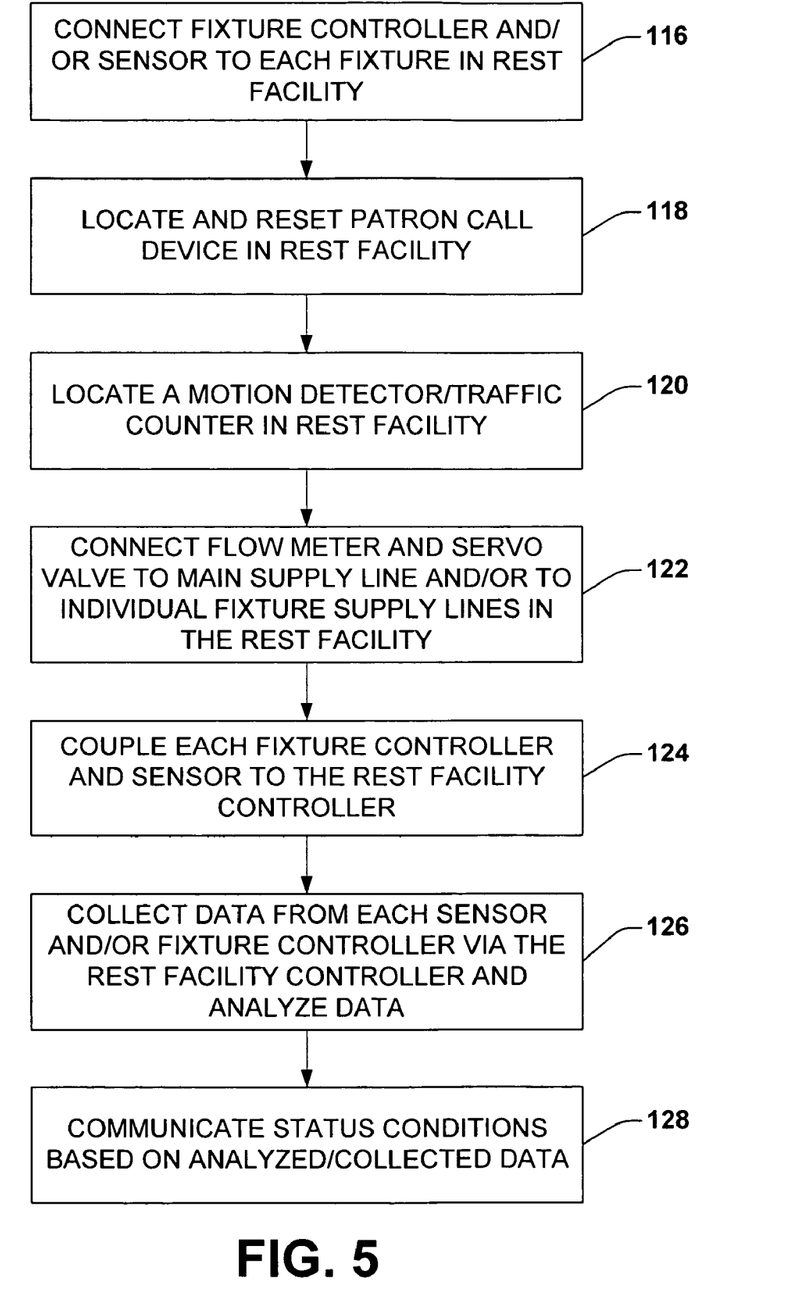
FIG. 5 is a flow chart diagram illustrating a method of monitoring and/or controlling a rest room according to another embodiment of the present invention.

A more detailed description of functionality may be found in FIG. 5, wherein the rest room is appropriately configured by connecting a fixture controller and/or a sensor to various fixtures in the rest room at 116. In one embodiment of the invention, each fixture within the rest room is coupled with either a sensor, a fixture controller, or both, however, coupling to only a subset of all fixtures is also contemplated by the present invention. An exemplary fixture controller is a Sloan MCR-4001-A, manufactured by Sloan Valve, however, other type fixture controllers or generic type controllers may be employed in accordance with the present invention.

In addition, a patron call device is located in one or more locations within the rest room at 118. A patron call device, in one example, is a manually actuated sensor or controller that sends a message or alarm upon an actuation thereof. A patron call device, as discussed supra, may be generic in one example, wherein any service request may be sent thereby. Alternatively, the patron call device may provide for differing types of service need requests by having multiple buttons or button sequences to identify the type of service needed. In the above manner, a user may provide varying levels of detail in such a request, as may be appreciated. More details regarding the use of a patron call device in accordance with the present invention will be described in greater detail infra.

A motion detector and/or traffic counter is further placed within the rest room in one example, in order to collect data regarding the number of patrons visiting the rest room at a given time and/or over various time periods at 120. A water flow meter and valve are also coupled to the main water supply line associated with the rest room, and/or similarly coupled to various sub-lines associated with individual fixtures such as toilets, urinals or sinks at 122. Each of the fixture controllers and sensors are then operably coupled to their respective rest room controller at 124. In one example, such devices are coupled discretely via coaxial cable, a twisted pair or other connection means. Alternatively, such devices may be coupled in a wireless manner using, for example, a Bluetooth communications standard or other type wireless protocol, as may be appreciated. Any form of communication coupling may be employed and is contemplated by the present invention.

The data, upon collection at each sensor and/or fixture controller, is then transmitted to the rest room controller at 126 and analyzed, wherein upon analysis of the various pieces of data, one or more status conditions associated with the various functions in the rest room are communicated to a global command unit or to various predetermined users at 128.

Figure 6:
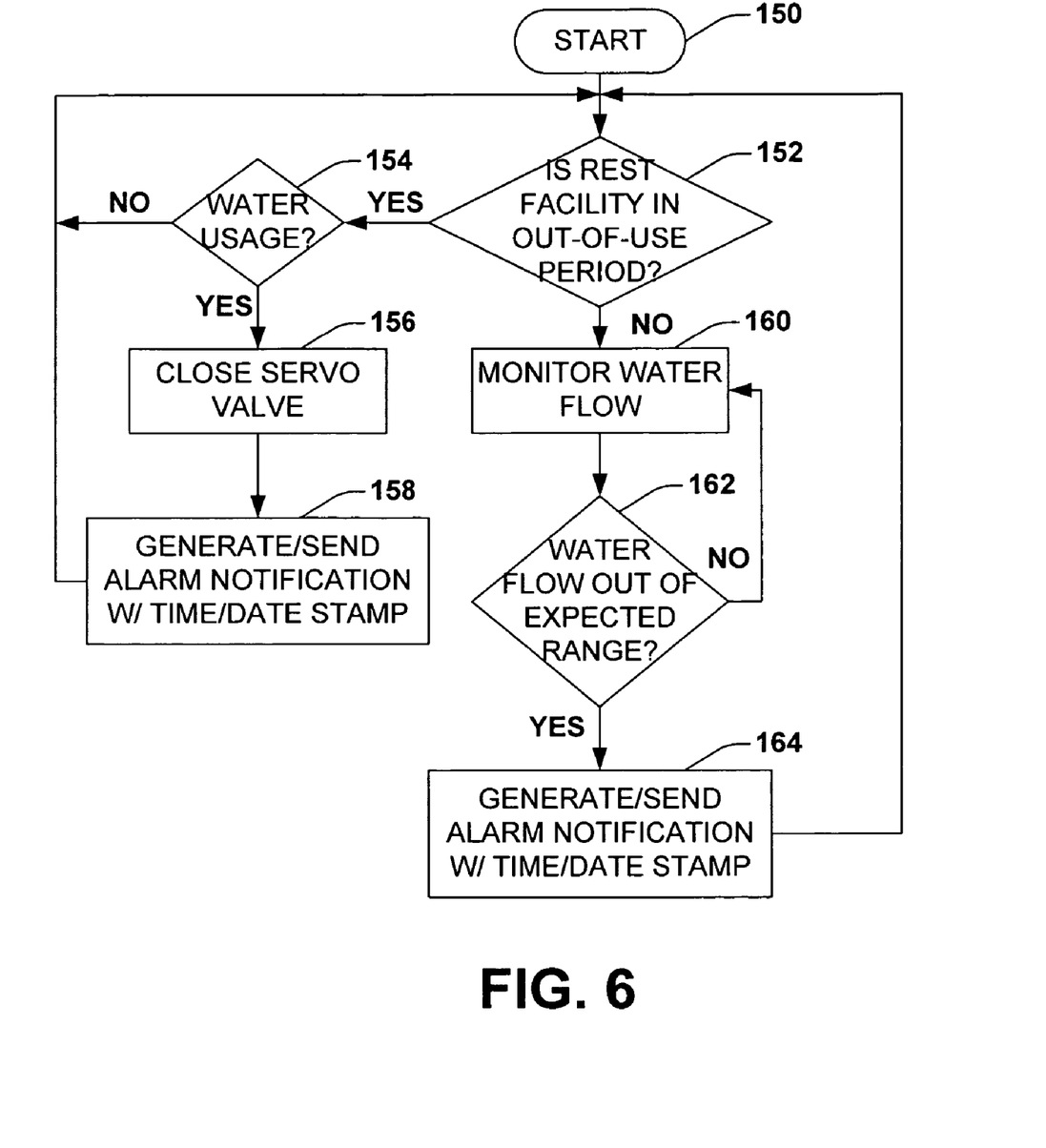
FIG. 6 is a flow chart diagram illustrating a method of collecting and analyzing data received from one or more sensors in a rest room according to another aspect of the present invention.

One example of such functionality is provided in greater detail in FIG. 6, wherein the method starts at 150 and a query is made at 152 whether the rest room is presently in an out-of-use period. For example, in some instances, one or all rest rooms in a given venue may have designated out-of-use periods, wherein no use of the facility is expected. One such example, would be in a sports stadium in the off-season, wherein certain public bathrooms are not expected to be used. This can be accounted for via an internal clock in the rest room controller or in the global command unit. If the rest room is in an out-of-use period (YES at 152), a second query is made at 154 to determine whether water usage is detected. For example, if the water flow sensor detects water flow through the main water supply line associated with that rest room (YES at 154), the rest room controller may conclude that a leak exists or an unauthorized use is occurring. In such an instance, the rest room controller is configured to send a command to the valve associated with the water supply line to close in order to prevent water flow at 156. In addition, a time/date stamp associated with the detection and/or correction action is generated at 158. In addition, at 158 an alarm notification is generated and transmitted to the global command unit for subsequent communication to appropriate personnel, for example, via a pager, cell phone, personal digital assistant (PDA), or computer workstation. Alternatively, if a global command unit is not being employed, the rest room controller may send the alarm and provide further information regarding its fixture controller identification in order to ascertain which rest room is requiring attention.

Returning to the query at 152, if the rest room is not in an out-of-use period (NO), water flow information is transmitted from a water flow sensor to the rest room controller at 160. The rest room controller then analyzes the water flow data at 162 and queries whether such flow is outside of an expected range based upon predetermined criteria or dynamically varying criteria associated with other pieces of data, as desired. For example, if the water flow is not outside of an expected range (NO at 162), continued monitoring may occur at 160, while if the water flow is determined to be outside an expected range (YES at 162), then an alarm is generated at 164 and communicated. In addition, the alarm notification is date/time stamped.

In one example, such water flow analysis can be employed to ensure that a pipe is not leaking or a flooding situation is occurring. Alternatively, or additionally, if the water flow is being monitored at sub-lines associated with individual fixtures, the rest room controller can analyze multiple pieces of data. For example, if multiple toilets are using water within an expected range or a given period of time, and another toilet is using substantially less or substantially more water, an alarm notification may be generated to initiate a maintenance request to investigate a potential clog, leak or other problem.

Figure 7:
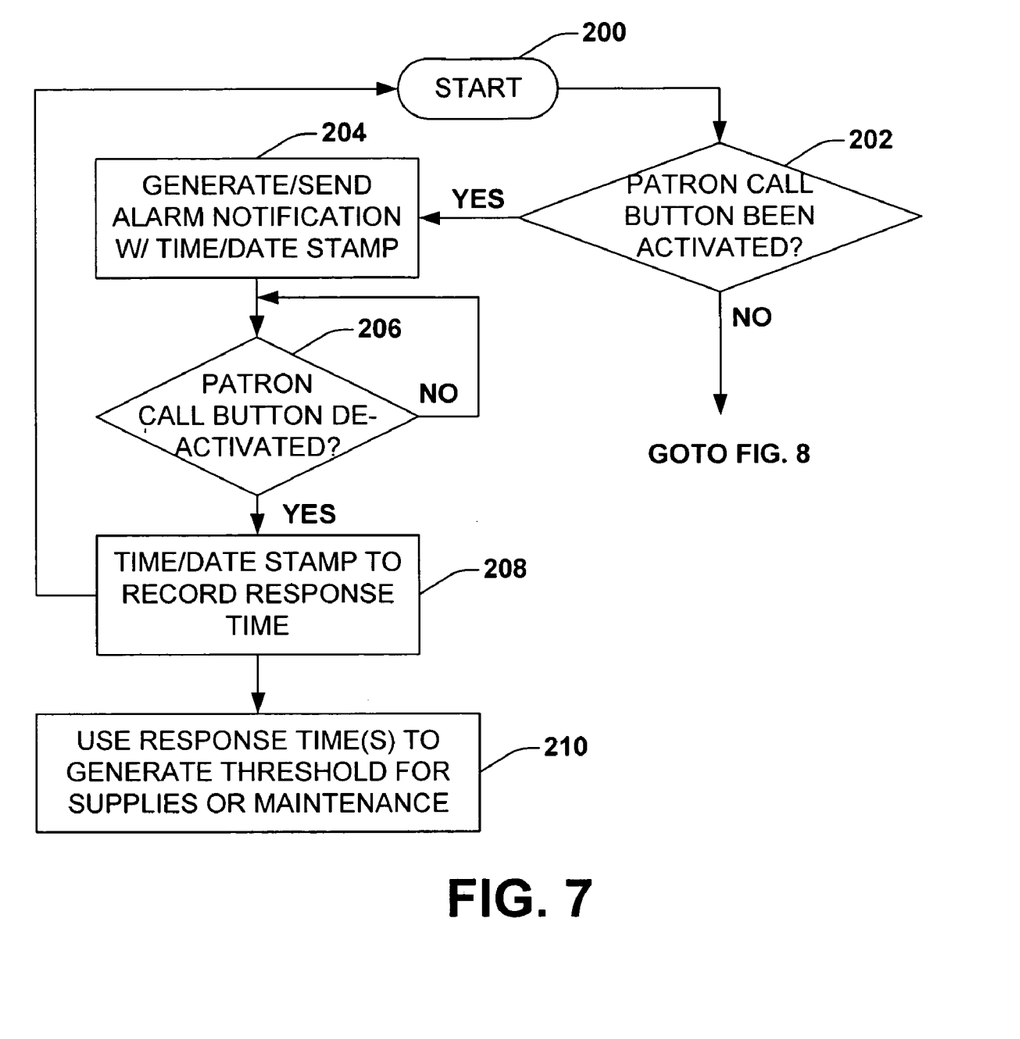
FIG. 7 is a flow chart diagram illustrating a method of monitoring a patron call device in a rest room in accordance with the present invention.

Another example of functionality of the present invention is illustrated in FIG. 7, beginning at 200, and continuing to 202, wherein a query is made whether a patron call device within a specific rest room has been activated. If so (YES at 202), the rest room controller identifies the activation thereof and generates an alarm notification at 204. The alarm notification is sent to a global command unit or to one or more particular communication devices in response thereto, and the alarm notification is time/date stamped. The method continues at 206, wherein a query is made whether the patron call device has been deactivated. According to a response procedure, upon the service request being fully addressed, a user will deactivate the device (YES at 206).

When the patron call device is deactivated, this action is sensed and is time/date stamped at 208. The rest room controller may then analyze the data or send it to the global command center for analysis at 210, wherein the elapsed time associated with the service request is calculated and recorded. This information may be used for quality control purposes, or may further be used to dynamically alter thresholds for supplies and maintenance requests. For example, if it is determined that an average response time for supply replenishment requests is 20 minutes, the threshold at which at an automated request is generated may be altered to ensure that future replenishment occurs prior to the supplies being exhausted, thereby minimizing future manual patron requests. In the above manner, the control system may better predict how to service various needs associated with the rest room.

Figure 8:
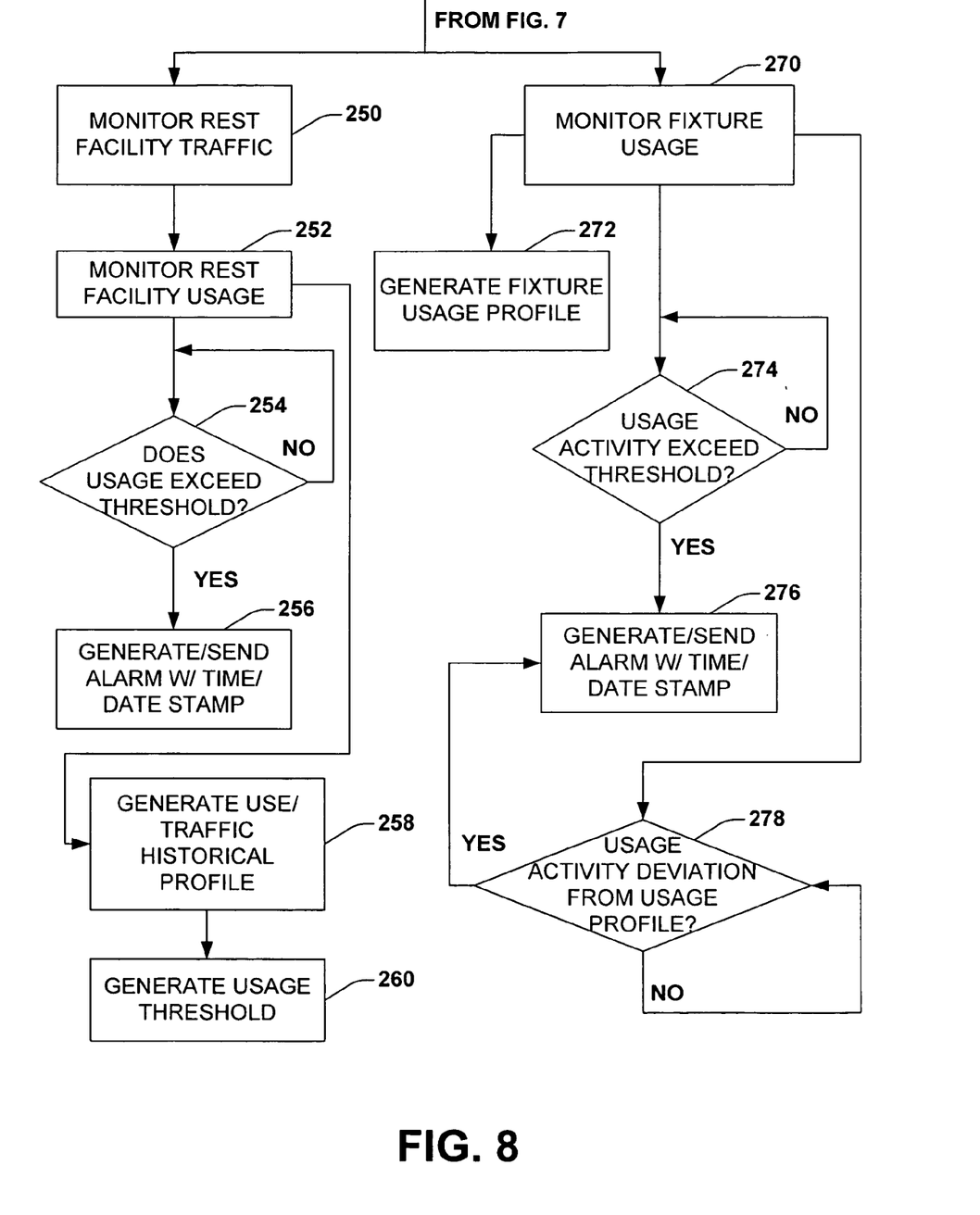
FIG. 8 is a flow chart diagram illustrating a method of monitoring rest room traffic and/or usage in accordance with yet another aspect of the present invention.

If at 202 of FIG. 7, a determination is made that a patron call button has not been activated, the method continues in FIG. 8, wherein various functions may be performed in parallel, for example. At 250, rest room traffic is monitored, for example, using motion detectors as sensors in one or more locations within the rest room. In one example, a motion detector is located near an entrance of the rest room, and motion activity is sensed, and sent as data to the rest room controller or LCU, which maintains a count of traffic. In addition, at 252, rest room usage may be monitored using one or a plurality of different sensors and/or fixture controllers sending data to the rest room controller. In one example, usage is defined differently than traffic in the rest room because not all patrons who enter the restroom use a toilet, or sink, but instead many enter for grooming purposes, and thus are not necessarily consuming supplies. Consequently, in another aspect of the invention, the rest room controller or the global command unit may take the rest room traffic data and usage data and generate use/traffic historical profiles at 258 and use such data to generate usage thresholds at 260 or use such data for other purposes, as may be desired.

In one aspect of the present invention, rest room usage is compared to a predetermined threshold at 254, and if exceeded (YES at 254), the rest room controller generates an alarm notification with a time/date stamp and transmits such alarm to a user via one or more devices and/or sends the alarm to the global command unit at 256. The time/date stamp can be useful in evaluating response times to such alarms which then can be further used to dynamically adjust various thresholds to ensure that alarms are set at appropriate times so as to avoid one or more of the supplies being completely exhausted.

Still referring to FIG. 8, the usage of one or more fixtures in the rest room are monitored at 270 via sensors and/or fixture controllers, as discussed supra. Based on the received data, the rest room controller (LCU) or the global command unit may generate fixture usage profiles at 272. A query is then made at 274 whether usage activity associated with one or more of the fixtures exceeds a threshold. If so (YES at 274), the rest room controller generates an alarm notification and a time/date stamp, and transmits such alarm to a user via one or more devices and/or sends the alarm to the global command unit at 276.

In addition, or alternatively, based on the monitored fixture usage at 270 and the generated fixture usage profile at 272, the method may further query whether the monitored usage activity of one or more of the fixtures deviates from the predetermined or dynamically generated usage profile at 278. If so, an alarm notification is generated and time/stamped, and then transmitted to a user via one or more devices and/or sends the alarm to the global command unit.

As discussed above, the rest room control system and method of the present invention advantageously provides for real time monitoring of one or more fixtures associated with a rest room, and such system and method is expandable to the monitoring and control of multiple rest rooms in a large venue, for example. By providing such real time monitoring, alarm notifications associated with such functions can be communicated in a timely manner, thereby facilitating improved service need or preventive maintenance response.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A rest room control system, comprising:
    one or more sensors configured to monitor or control a function associated with the rest room; and
    a controller operably coupled to the one or more sensors, and configured to receive data therefrom associated with the function, and communicate a status condition associated with the function in response thereto;
    wherein the one or more sensors comprises a flow meter, and wherein the function comprises a water flow through a water supply line of the rest room, and wherein the data comprises an indication whether a flow of water exists in the water supply line, or an amount of water used in the rest room over a period of time.

2. The rest room control system of claim 1, wherein the status condition comprises a fault notification associated with the function.

3. The rest room control system of claim 1, wherein the status condition comprises an operation parameter indicative of the function.

4. The rest room control system of claim 1, wherein the controller is further configured to collect and save the received data over a period of time and generate historical information associated with the function.

5. The rest room control system of claim 1, wherein another sensor comprises a motion detector and the function comprises indicating whether the rest room is occupied, and wherein the controller is further configured to communicate a fault notification when water flow is detected by the flow meter and no occupancy is registered by the motion detector.

6. The rest room control system of claim 1, further comprising a valve operably coupled to the water supply line and the controller, wherein the controller is operable to ascertain a status of the valve or open and close the valve, thereby selectively enabling or preventing water flow in the water supply line in response to the received data.

7. The rest room control system of claim 6, wherein the controller is further configured to close the valve based upon a programmed out-of-use time period of the rest room.

8. The rest room control system of claim 1, wherein another of the one or more sensors comprise a plurality of sensors each operable to sense a same characteristic of a plurality of rest room fixtures comprising an activity thereof, respectively, and wherein the characteristic is received as data by the controller over a period of time, and wherein the controller is configured to generate an alarm when one of the fixtures has an activity level that differs substantially from an activity level of the other of the plurality of fixtures during the time period.

9. A rest room control system, comprising:
one or more sensors configured to monitor or control a function associated with the rest room; and
a controller operably coupled to the one or more sensors, and configured to receive data therefrom associated with the function, and communicate a status condition associated with the function in response thereto;
wherein one sensor comprises a motion detector, and the function comprises indicating whether the rest room is occupied, and wherein the controller is further configured to maintain a count associated with a use of the facility based thereon, and wherein the status condition comprises an alarm when the count exceeds a predetermined threshold, wherein the alarm communicates a cleaning request, a rest room supply replenishment request, or a preventive maintenance request.

10. The rest room control system of claim 9, wherein the controller is further configured to generate a time/date stamp based on a change in the count over a period of time and generate historical use data of the rest room based thereon.

11. The rest room control system of claim 10, wherein the controller is further configured to employ the historical use data to alter the predetermined threshold, thereby dynamically adjusting a timing associated with the alarm that communicates the cleaning request, the supply replenishment request, or the preventive maintenance request.

12. The rest room control system of claim 10, wherein a subsequent response to the communicated request is time/date stamped and communicated to the controller, and wherein the controller is further configured to employ one or more time periods between the request and the response to alter the predetermined threshold, thereby dynamically adjusting a timing associated with the alarm that communicates the cleaning request, the supply replenishment request, or the preventive maintenance request.

13. A rest room control system, comprising:
one or more sensors configured to monitor or control a function associated with the rest room; and
a controller operably coupled to the one or more sensors, and configured to receive data therefrom associated with the function, and communicate a status condition associated with the function in response thereto;
wherein the one or more sensors comprise a plurality of activation sensors, each associated with one of a plurality of toilets or urinals, or both, in the rest room, and wherein the controller or a global command unit associated therewith is configured to prevent more than a predetermined number of toilets or urinals, or both, to be flushed substantially simultaneously.

14. A rest room control system, comprising:
a plurality of controllers, wherein each of the controllers is operably associated with one of a plurality of rest rooms;
a plurality of sensor groups, wherein each sensor group is associated with one of the rest rooms and operably associated with the controller associated with one of the rest rooms and operably associated with the controller associated therewith, wherein each sensor group comprises one or more sensors configured to monitor or control a function associated with the respective facility; and
a global command unit operably coupled to each of the controllers,
wherein each of the controllers is operably coupled to the one or more sensors in the respective facility, and is configured to receive data associated with the function and communicate a status condition associated with the function in response thereto, and
wherein the global command unit is configured to receive the status conditions from each of the controllers, analyze the status conditions and provide global status indications or alarm indications based thereon.

15. The rest room control system of claim 14, wherein the global command unit is configured to communicate an alarm indication to one or more devices, wherein the devices comprise a pager, a cell phone, a wireless personal digital assistant (PDA), or an operably coupled computer workstation.

16. The rest room control system of claim 15, wherein the global command unit is further configured to categorize the alarm indication into one of a plurality of categories, and communicate the alarm indication to a predetermined device based on the categorization thereof.

17. The rest room control system of claim 14, wherein the global command unit is configured to time/date stamp each received status condition that generates an alarm.

18. A method of monitoring a rest room, comprising:
operably associating a sensor or a fixture controller, or both, with a fixture in the rest room;
operably associating the sensor or fixture controller, or both, to a rest room controller;
sensing or controlling a function associated with the fixture with the sensor or fixture controller, respectively;

transmitting data indicative of the function from the sensor or fixture controller, or both, to the rest room controller; and analyzing the transmitted data with the rest room controller and communicating a status condition associated with the function;

wherein the function associated with the fixture comprises a water flow associated with a water supply line, and wherein analyzing the transmitted data comprises:

determining whether water is flowing in a water supply line during an out-of-use time period;

closing a valve associated with the water supply line in the affirmative; and generating an alarm notification associated therewith; or wherein analyzing the transmitted data comprises:

determining an amount of water flowing in a water supply line over a predetermined period of time;

determining whether the amount of water in the predetermined time period falls within an expected range; and generating an alarm notification if the amount of water is not within the expected range.

19. A method of monitoring a rest room, comprising:

operably associating a sensor or a fixture controller, or both, with a fixture in the rest room;

operably associating the sensor or fixture controller, or both, to a rest room controller;

sensing or controlling a function associated with the fixture with the sensor or fixture controller, respectively;

transmitting data indicative of the function from the sensor or fixture controller, or both, to the rest room controller; and analyzing the transmitted data with the rest room controller and communicating a status condition associated with the function;

wherein the sensor comprises a patron call device configured to be manually activated upon a need for service associated with the rest room, wherein communicating a status condition comprises transmitting an alarm indication to one or more devices.

20. The method of claim 19, wherein the one or more devices comprise a pager, cell phone, a wireless personal digital assistance (PDA), or an operably coupled computer workstation.

21. The method of claim 19, further comprising generating a time/date stamp associated with an activation of the patron call device.

22. The method of claim 21, further comprising:

deactivating the patron call device upon providing the needed service; and generating a time/date stamp upon the deactivation to ascertain a response time associated with the service request.

23. The method of claim 22, further comprising using one or more response times to generate a threshold associated with preventive maintenance alarms or supply replenishment alarms.

24. A method of monitoring a rest room, comprising:

operably associating a sensor or a fixture controller, or both, with a fixture in the rest room;

operably associating the sensor or fixture controller, or both, to a rest room controller;

sensing or controlling a function associated with the fixture with the sensor or fixture controller, respectively;

transmitting data indicative of the function from the sensor or fixture controller, or both, to the rest room controller; and analyzing the transmitted data with the rest room controller and communicating a status condition associated with the function;

wherein the sensor comprises one or more activation sensors associated with one or more like fixtures, respectively, and wherein sensing a function comprises monitoring usage of the one or more fixtures at a given time or over a period of time, or a plurality of sensors comprising a plurality of activation sensors, each associated with one of a plurality of toilets or urinals in the rest room, and further comprising:

evaluating an activation of the plurality of toilets or urinals, or both; and preventing more than a predetermined number of toilets or urinals, or both, to be flushed substantially simultaneously.

25. The method of claim 24, wherein communicating a status indication comprises generating an alarm notification when the monitored usage exceeds a predetermined threshold, wherein the alarm notification communicates a preventive maintenance request or a supply replenishment request.

26. The method of claim 24, further comprising:

generating a fixture usage profile based on an average or an expected range of fixture usage in the rest room at a plurality of different time periods; and generating the predetermined threshold based thereon.

* * * * *